United States Patent [19]

Gailey

[11] Patent Number: 4,926,895
[45] Date of Patent: May 22, 1990

[54] SOCKET ASSEMBLY

[75] Inventor: Edward D. Gailey, Mentor, Ohio

[73] Assignee: Tuthill Corporation, Cleveland, Ohio

[21] Appl. No.: 376,761

[22] Filed: Jul. 7, 1989

[51] Int. Cl.$^5$ ............................................. F16L 37/28
[52] U.S. Cl. ....................................... 137/15; 137/315; 251/149.6; 251/361
[58] Field of Search ................... 251/149.6, 149.1, 361; 137/315, 15; 285/321, 316; 403/326

[56] References Cited

U.S. PATENT DOCUMENTS

| | | | |
|---|---|---|---|
| 2,805,089 | 9/1957 | Hansen | 285/321 |
| 3,129,919 | 4/1964 | Evans | 251/149.6 |
| 3,144,262 | 8/1964 | Reynolds | 285/321 |
| 3,567,175 | 3/1971 | Scivto, Jr. | 251/149.6 |
| 4,240,654 | 12/1980 | Gladieux | 285/321 |
| 4,280,523 | 7/1981 | Norton | 251/149.6 |
| 4,645,180 | 2/1987 | Bregman et al. | 403/326 |

Primary Examiner—A. Michael Chambers
Attorney, Agent, or Firm—Tarolli, Sundheim & Covell

[57] ABSTRACT

A retainer ring holds parts of a socket assembly against relative movement. The retainer ring is disposed in an outwardly facing groove in a first socket part and an inwardly facing groove in a second socket part. A resilient seal ring is compressed between surfaces on the socket parts to press side surfaces of the grooves against surface areas on opposite sides of the retainer ring. When the socket parts are to be assembled, the retainer ring is telescopically positioned on the end of the first socket part. The second socket part is pressed against the retainer ring to move the retainer ring toward the outwardly facing groove along a flaring surface which expands the retainer ring. The retainer ring is pushed into an outwardly facing groove in the first socket part by the second socket part. When the retainer ring is in the groove in the first socket part, the retainer ring cooperates with the grooves in the two socket parts to hold them in their telescopic relationship. As the retainer ring is pushed toward the groove in the first socket part, the seal ring is compressed between the two socket parts to apply preload forces against the retainer ring when the socket parts are interconnected.

8 Claims, 5 Drawing Sheets

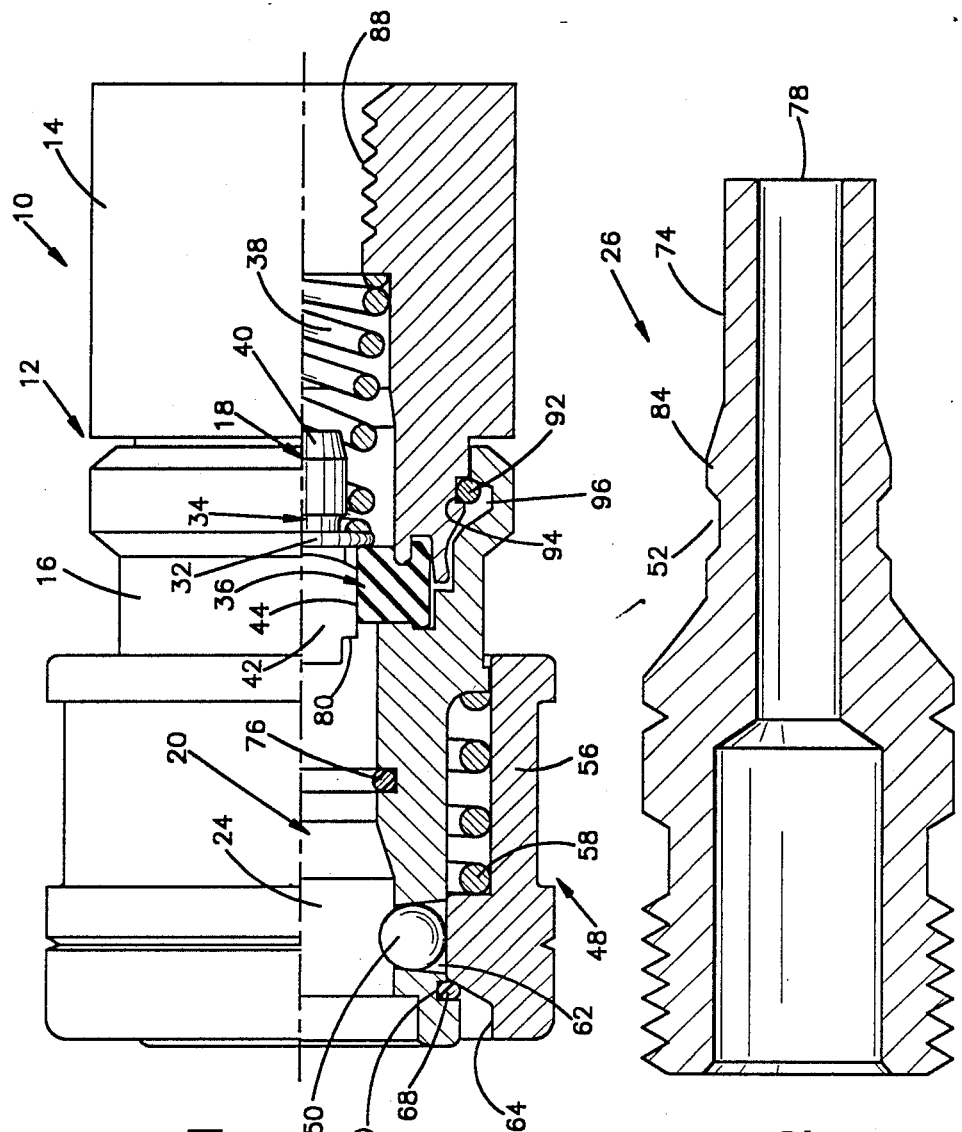

SOCKET ASSEMBLY

BACKGROUND OF THE INVENTION

The present invention relates to a method of assembling a new and improved socket assembly which receives a plug to enable fluid to be conducted between the socket assembly and plug.

A known socket assembly which is used in a quick disconnect coupling is disclosed in U.S. Pat. No. 2,805,089 issued Sept. 3, 1957 and entitled "Pipe Coupling With Wedged Spring Ring Detent Means". This socket assembly includes two castings or socket parts which are threadably connected together. An annular rubber seal ring or gasket seals a joint between the socket parts In addition, prior to insertion of a plug, a valve member in the socket assembly engages the seal ring to block fluid flow through the socket assembly.

Internal and external threads must be formed on the parts of this known socket assembly by separate machining operations in order to enable the socket parts to be interconnected. Of course, the machining operations required to form the internal and external threads on the socket parts contributes to the cost of making the socket assembly. In addition, the joint between the socket parts can be loosened so that it is no longer fluid tight by rotating one of the socket parts relative to the other socket part.

SUMMARY OF THE INVENTION

An improved socket assembly receives a plug to enable fluid to be conducted between the socket assembly and the plug. The socket assembly includes a socket body having first and second socket parts which are interconnected by a retainer ring disposed in grooves in the socket parts. A resilient seal ring is compressed between surfaces on the socket parts to press the socket parts against the retainer ring.

When the first and second socket parts are to be interconnected, the retainer ring is telescopically positioned on an end portion of the first socket part at a location offset from an outwardly opening groove in the first socket part. The retainer ring is engaged with the outwardly opening groove in the first socket part and an inwardly opening groove in the second socket part by pressing against the retainer ring with the second socket part to move the retainer ring toward the groove in the first socket part and resiliently expand the retainer ring. As the retainer ring is moved toward the groove in the first socket part, a seal ring is compressed between the two socket parts. After the socket parts have been interconnected, a plug can be inserted into a socket chamber formed by at least one of the socket parts. A locking assembly is disposed on the one socket part to engage the plug and hold it in the socket chamber.

Accordingly, it is an object of this invention to provide a new and improved method of making a socket assembly and wherein a retainer ring is moved into engagement with grooves in a pair of socket parts by pressing against the retainer ring with one socket part to resiliently expand the retainer ring and move the retainer ring toward the groove in the other socket part.

Another object of this invention is to provide a new and improved socket assembly for receiving a plug to enable fluid to be conducted between the socket assembly and the plug and wherein a retainer ring is disposed in grooves in first and second socket parts to connect the first socket part with the second socket part.

BRIEF DESCRIPTION OF THE DRAWINGS

The foregoing and other objects and features of the present invention will become more apparent upon a consideration of the following description taken in connection with the accompanying drawings, wherein:

FIG. 1 is a partially broken away sectional view of a socket assembly constructed in accordance with the present invention;

FIG. 2 is a sectional view illustrating the construction of a plug which is received in the socket assembly of FIG. 1 to enable fluid to be conducted between the plug and socket assembly;

DESCRIPTION OF ONE SPECIFIC PREFERRED EMBODIMENT OF THE INVENTION

Socket Assembly—General Description

Figure 3:
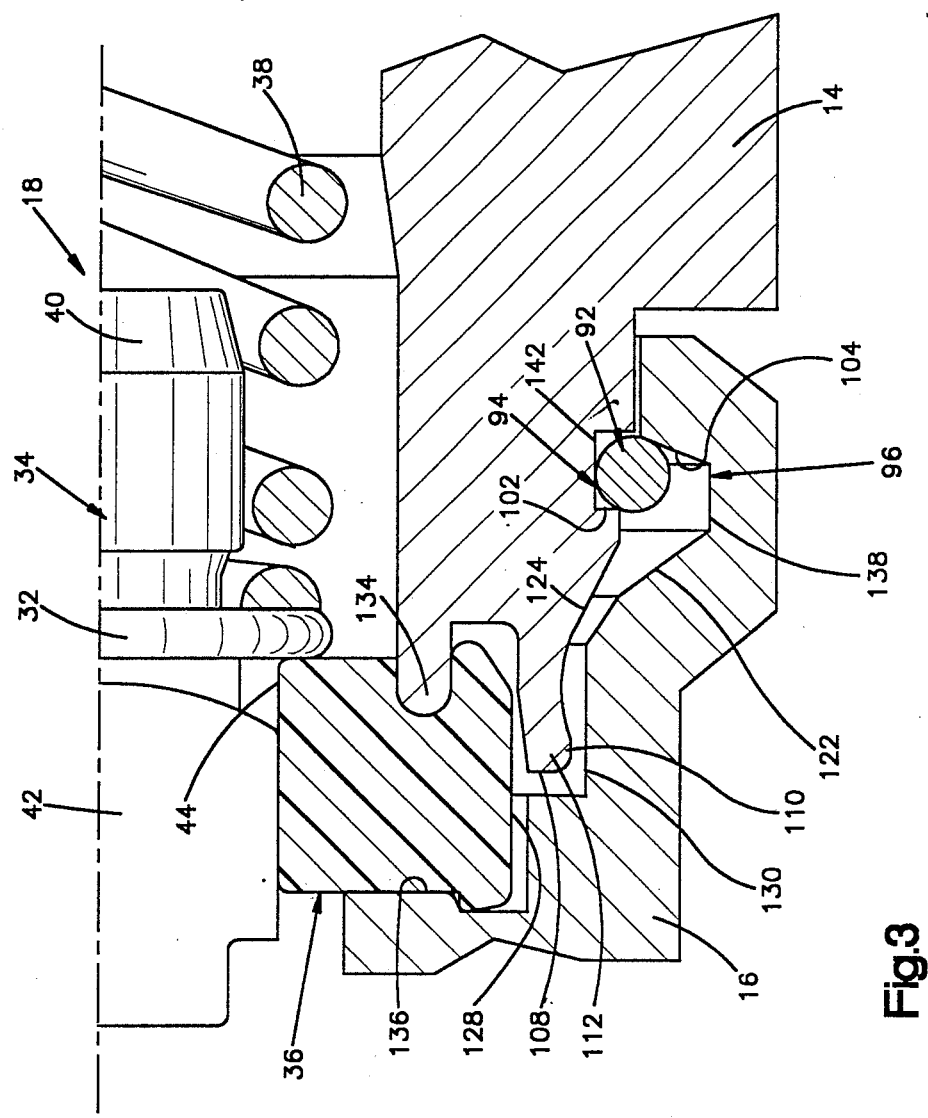
FIG. 3 is an enlarged fragmentary view of a portion of FIG. 1 illustrating the manner in which a retainer ring engages grooves in a pair of socket parts to interconnect the socket parts and the manner in which a resilient seal ring is compressed between the socket parts.

An improved socket assembly 10 constructed in accordance with the present invention is illustrated in FIG. 1. The socket assembly 10 includes a socket body 12 having a cylindrical first or inner socket body part 14 and a cylindrical second or outer socket body part 16. A valve assembly 18 is disposed in a socket chamber 20. The valve assembly 18 blocks fluid flow between an inner portion 22 and an outer portion 24 of the socket chamber 20 when a plug 26 (FIG. 2) is separate from the socket assembly 10. The valve assembly 18 has the same construction as is disclosed in U.S. Pat. No. 2,805,089.

When the valve assembly 18 is in the closed condition of FIG. 1, an annular flange 32 on a valve member 34 is pressed against an annular seal ring 36 by a valve spring 38. The valve spring 38 engages a spring mounting section 40 of the valve member 34 to position the coil spring relative to the valve member. A flat guide section 42 extends outwardly from the flange 32 through a circular opening 44 in the seal ring 36.

A locking assembly 48 is provided on the second or outer socket part 16 to retain the plug 26 (FIG. 2) in the socket assembly 10 (FIG. 1). The locking assembly 48 includes a plurality, in the illustrated embodiment of the invention three, spherical locking or detent balls 50. The stainless steel locking balls 50 project into the outer portion 24 of the socket chamber 20 to engage a circular locking groove 52 (FIG. 2) formed in the brass plug 26.

A cylindrical metal locking sleeve 56 (FIG. 1) is movable between the engaged position shown in FIG. 1 and a retracted or disengaged position. When the cylindrical locking sleeve 56 is in the engaged position shown in FIG. 1, a cylindrical inner side surface 62 on the locking sleeve presses against the locking balls 50 to hold them in the engaged position shown in FIG. 1. When the locking sleeve 56 is manually moved toward the right, as viewed in FIG. 1, against the influence of the biasing spring 58, a circular recess 64 in the outer end portion of the locking sleeve 56 moves into alignment with the locking balls 50. The recess 64 enables the balls 50 to move radially outwardly relative to the cylindrical outer or second socket part 16. A circular snap ring 68 is disposed in a groove 70 at the outer end of the outer socket part 16 to limit axially outward movement of the locking sleeve 56 under the influence of biasing spring 58.

When the plug 26 (FIG. 2) is to be inserted into the socket assembly 10, the locking sleeve 56 (FIG. 1) is pulled inwardly against the influence of the biasing spring 58 to move the groove 64 into radial alignment with the locking balls 50. This enables the locking balls 50 to be moved radially outwardly to a disengaged condition by the plug 26 as it is inserted into the socket chamber 20.

As the plug 26 is inserted into the socket chamber 20, a cylindrical outer side surface 74 (FIG. 2) on a leading end portion of the plug 26 is engaged by an 0-ring seal 76 (FIG. 1) in the outer socket body part 16. Immediately thereafter, an annular leading end surface 78 on the plug 26 engages a shoulder 80 formed on the flat guide section 42 of the valve member 34. Continued movement of the plug 26 into the socket chamber 20 moves the flange 32 on the valve member 34 away from the seal ring 36 against the influence of the valve spring 38. As this occurs, the locking balls 50 are moved outward by an annular cam ring or collar section 84 (FIG. 2) of the plug 26.

As the plug 26 moves still further into the socket chamber 20, the cylindrical leading end portion 74 of the plug is telescopically received in and seals against the sides of the circular opening 44 in the seal ring 36 (FIG. 1). As this occurs, the locking balls 50 engage the annular groove 52 in the plug 26. The cylindrical locking sleeve 56 is then released and the balls 50 are cammed inwardly into locking engagement with the retaining groove 52 in the plug 26 by the sleeve as it moves axially outwardly under the influence of the spring 58. The locking balls 50 then cooperate with the annular cam ring or collar section 84 of the plug 26 to firmly hold the plug in the socket chamber 20.

During movement of the plug 26 into the socket chamber 20, the valve member 34 is moved from the closed position of FIG. 1 to a fully open position against the influence of the biasing spring 38. This movement of the valve member is guided by engagement of the flat guide section 42 of the valve member with the cylindrical inner side surface 44 of the seal ring 36.

When the valve member 34 is in the open position, fluid can flow along opposite sides of the flat guide section 42, through the seal ring 36 and around the flange 32 to enable fluid to be conducted either from the inner portion 22 of the socket chamber 20 to the plug 26 or to be conducted from the plug 26 to the inner portion 22 of the socket chamber. Although the plug 26 and socket assembly 10 can each be connected to separate fluid conduits, internal threads 88 on the inner or first socket part 14 may advantageously be connected with a valve which controls the flow of gas from a tank or other source. In this specific instance, the plug 26 is connected in fluid communication with a conduit connected to an appliance in which the gas is burned in a manner similar to that disclosed in U.S. Pat. No. 4,280,523, issued July 28, 1981 and entitled "Thermal Responsive Coupling".

When the plug 26 is to be disconnected from the socket assembly 10, the locking sleeve 56 is retracted against the influence of the biasing spring 58. This enables the collar or cam section 84 on the plug 26 to cam or force the locking balls radially outwardly into the groove 64 in the sleeve 56 as the plug is withdrawn from the socket chamber 20. During movement of the plug out of the socket chamber 20, the valve member 34 is moved back to the closed position shown in FIG. 1 by the valve spring 38. This moves the flange 32 on the valve member 34 back into sealing engagement with the seal ring 36 to block fluid flow through the valve assembly 10.

Retainer Ring

In accordance with one of the features of the present invention, the inner and outer socket parts 14 and 16 are held in the telescopic relationship of FIG. 1 by a retainer ring 92 in the manner illustrated in FIG. 3. The annular stainless steel retainer ring 92 engages an annular outwardly opening groove 94 (FIG. 3) in the brass first or inner socket part 14. In addition, the retainer ring 92 engages an annular inwardly opening groove 96 formed in the brass second or outer socket part 16. The retainer ring 92 retains the first and second socket parts 14 and 16 against movement relative to each other by abutting engagement of side surfaces of the grooves 94 and 96 with side surface areas of the retainer ring 92.

Thus, a radially extending axially outer cylindrical side surface 102 of the outwardly opening groove 94 engages a surface area on the left side (as viewed in FIG. 3) of the retainer ring 92. Similarly, a cylindrical side surface 104 of the inwardly opening groove 96 on the outer socket part 16 engages a right side of the retainer ring 92. Abutting engagement of the side surfaces 102 and 104 of the grooves 94 and 96 with the retainer ring 92 prevents the socket parts 14 and 16 from moving out of the engaged relationship shown in FIG. 3.

The elastomeric seal ring 36 is resiliently compressed between the outer or left end portion (as viewed in FIG. 3) of the first or inner socket part 14 and the inner or right end portion of the outer socket part 16. This enables the seal ring 36 to apply a force against the socket parts urging the sides 102 and 104 of the grooves 94 and 96 against the retainer ring 92. The compressive load force applied to the socket parts 14 and 16 by the seal ring 36 prevents wobbling movement between the socket parts.

Interconnecting the Socket Parts

Figure 4:
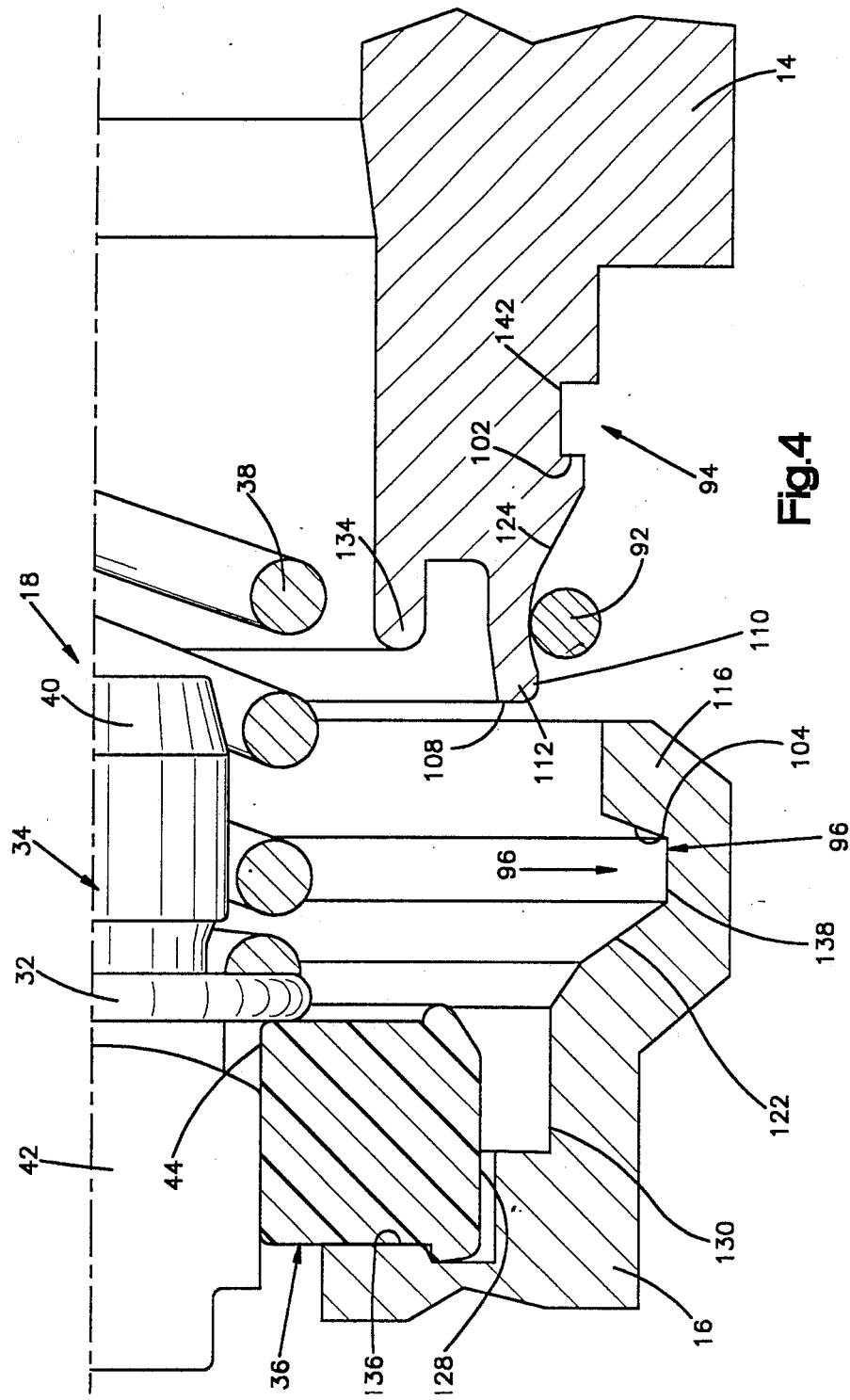
FIG. 4 is an illustration of the socket parts of FIG. 3 before they are interconnected, the retainer ring being shown telescopically positioned on an end portion of a first one of the socket parts at a location axially offset from an outwardly opening groove in the first socket part.

When the socket parts 14 and 16 are to be interconnected to form the socket body 12, the seal ring 36, valve member 34 and valve spring 38 are positioned in the second or outer socket body part 16, in the manner shown in FIG. 4. The annular retainer ring 92 is positioned on the leading or outer end portion 108 of the first or inner socket part 14. Thus, the annular retainer ring 92 is slid over a bulbous nose or outer end 110 on an annular outer end portion 108 of the inner socket part 14.

As the annular retainer ring 92 is slid over the circular bulbous nose portion 110, the ring expands slightly. It should be understood that the retainer ring 92 is not continuous, but rather has a radially extending gap or slit which is closed when the retainer ring in the relaxed or normal condition. As the retainer ring 92 is slid over the bulbous nose portion 110, the radially extending slit in the retainer ring increases slightly in size to accommodate resilient expansion of the retainer ring. Once the retainer ring 92 has been moved over the nose 110, the slit closes and the retainer ring assumes its initial or undeflected condition. However, the retainer ring is held against inadvertent falling off of the end portion 108 of the inner socket part 14 by the bulbous nose 110.

The outer end portion 108 of the inner socket part 14 and the inner end portion 116 (FIG. 4) of the outer socket part 16 are then moved into a telescopic relationship with each other. This can be accomplished by moving either one of the two socket parts axially toward the other socket part or by simultaneously moving both socket parts together. As the socket parts 14 and 16 are moved from the separated relationship illustrated in FIG. 4 into a telescopic relationship (FIG. 5), an axially trailing side surface 122 of the groove 96 is moved into abutting engagement with an axially trailing side of the retainer ring 92. As the telescopic relationship between the socket parts 14 and 16 increases, the trailing side surface 122 on the outer socket part 16 pushes the retainer ring 92 axially inwardly toward the outwardly opening groove 94. Thus, the retainer ring 92 is moved axially from the initial position shown in FIG. 4 through the positions shown in FIGS. 5 and 6 into the groove 94 (FIG. 3).

As the resilient stainless steel retainer ring 92 moves axially toward the groove 94 under the influence of force applied against the retainer ring by the outer socket part 16, the retainer ring 92 slides along an outwardly flaring ramp or cam surface 124 on the inner socket part 14. The cam surface 124 is formed as a portion of a cone and is effective to resiliently expand the retainer ring 92, in a radial direction, as the retainer ring moves axially toward the groove 94. Thus, as the retainer ring 92 moves from the position shown in FIG. 4 to the position shown in FIG. 5, the size of the radial slit in the retainer ring 92 and the circumference of the retainer ring 92 increases and the retainer ring is resiliently expanded radially outwardly.

Figure 5:
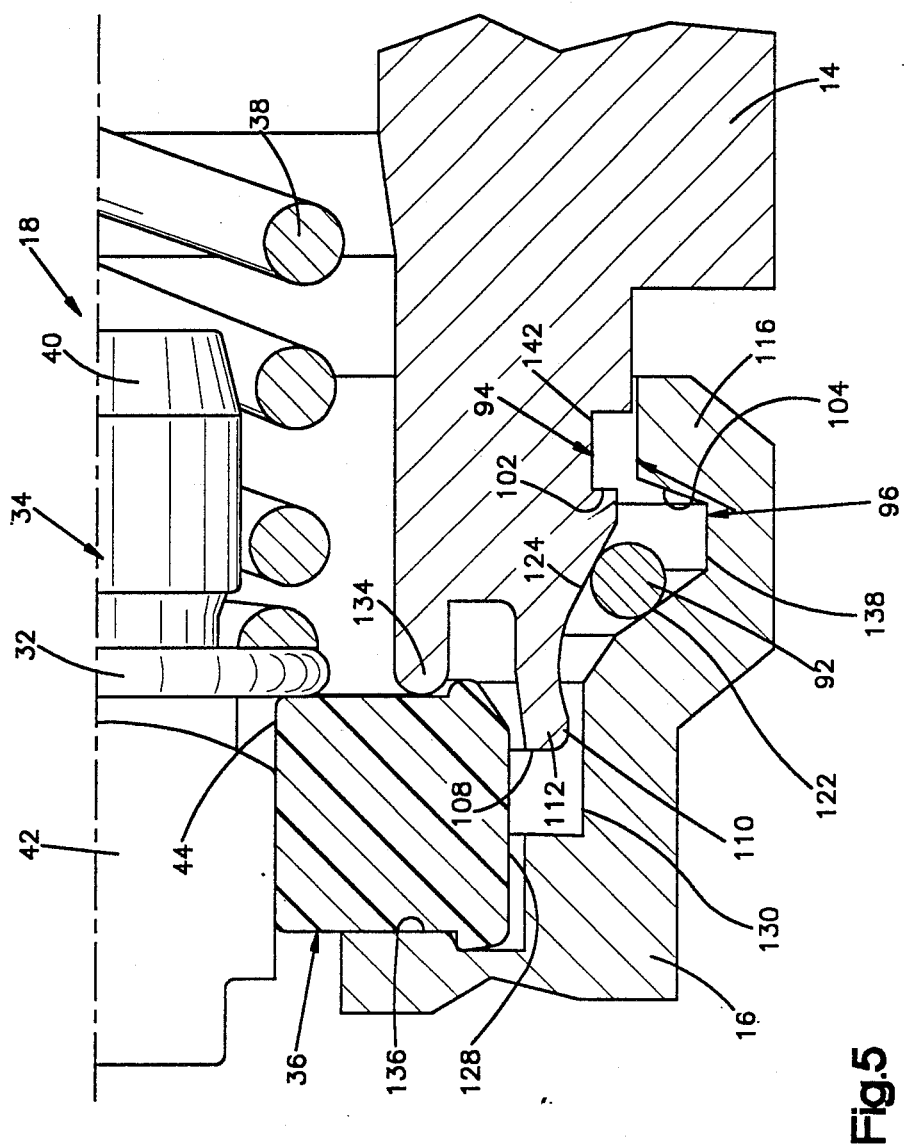
FIG. 5 is an enlarged illustration, similar to FIG. 4, of the manner in which the second socket part is pressed against the retainer ring to move the retainer ring axially toward the groove in the first socket part and resiliently expand the retainer ring.

As the telescopic relationship between the socket parts 14 and 16 increases, the annular outer end portion 108 of the inner socket part 14 cooperates with an annular outer side surface 128 of the seal ring 36 and a cylindrical inner side surface 130 on the socket part 16 to guide telescopic movement between the socket parts. Shortly after an annular guide section 112 on the inner socket part 14 has entered the space between the cylindrical outer side surface 128 of the seal ring 26 and the cylindrical inner side surface 130 of the outer socket part 16, an annular rim 134 on the inner socket part 14 engages the seal ring 36 (FIG. 5). As the telescopic relationship between the socket parts 14 and 16 continues to increase, the rim 134 compresses the seal ring 34 against an annular outwardly facing side surface 136 on the outer socket part 16. As the seal ring 36 is resiliently deformed by the circular rim 134 on the inner socket part 14, the polymeric material of the seal ring 36 is compressed between the rim 134 and the circular side surface 136 on the outer socket part 16.

As the telescopic relationship between the socket parts 14 and 16 continues to increase, the retainer ring 92 is pushed axially along the flaring cam or ramp surface 124 toward the outwardly facing groove 94 in the inner socket part 14. As the retainer ring 92 moves from the initial position of FIG. 4 toward the groove 92, the outwardly flaring cam or ramp surface 124 applies a radially outwardly directed force against a radially inner side of the retainer ring 92. This force increases the diameter of the retainer ring and expands the retainer ring (FIGS. 5 and 6).

Figure 6:
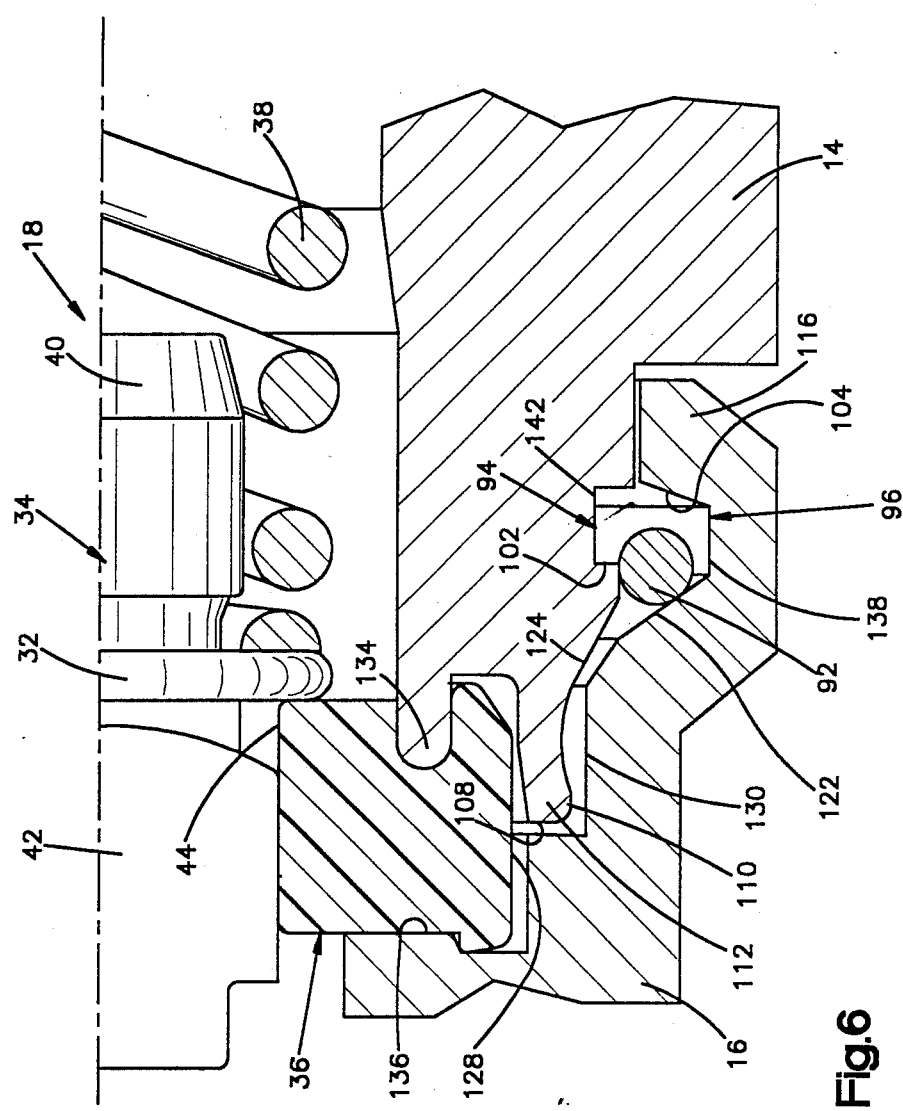
FIG. 6 is an illustration of the relationship between the socket parts of FIGS. 3-5 immediately before the retainer ring engages the outwardly opening groove in the first socket part.

As the retainer ring 92 resiliently expands from the initial condition of FIG. 4 through the condition shown in FIG. 5 to the condition shown in FIG. 6, the retainer ring slides radially outwardly along the annular trailing side surface 122 of the groove 96 toward an annular bottom surface 138 of the groove 96. Of course, as the retainer ring 92 is sliding radially outwardly along the trailing side surface 122 of the groove 96, the trailing side surface of the groove is applying an axially inwardly directed force against the retainer ring 92.

Immediately before the retainer ring 92 enters the groove 94 (FIG. 6), the retainer ring is positioned on an axially outer edge of the groove 94. At this time, the retainer ring 92 has been radially expanded to a maximum extent and is ready to snap into the groove 94 on the next increment of movement of the retainer ring toward the groove. As the telescopic relationship between the socket parts 14 and 16 increases incrementally from the relationship shown in FIG. 6, the center of the retainer ring 92 moves axially inwardly of the axially outer side surface 102 of the groove 94. As this occurs, the natural resilience of the retainer ring 92 causes it to snap into the groove 94 to the position shown in FIG. 3.

As the retainer ring 92 contracts radially and enters the groove 94, the retainer ring is cammed axially inwardly so that an axially leading or right side (as viewed in FIGS. 3 and 6) of the retainer ring 92 moves into abutting engagement with an axially leading side surface 104 of the groove 96 in the socket part 16. As this occurs, a radially inner portion of the retainer ring 92 moves into abutting engagement with a cylindrical bottom surface 142 of the groove 94. Thus, although the retainer ring is pushed from its initial position (FIG. 4) to the edge of the groove 94 by the trailing side surface 122 of the groove 96 in the socket part 16, the final portion of movement of the retainer ring into the groove 94 is, in part at least, under the influence of its own resilience.

As the retainer ring 92 snaps into the groove 94, the retainer ring moves away from the bottom surface 138 of the groove 96 in the outer socket part 16 and into engagement with the cylindrical bottom surface 142 of the groove 94 in the inner socket part 14. During movement of the retainer ring 92 from the position shown in FIG. 6 to the position shown in FIG. 3, the retainer ring resiliently contracts slightly from the maximum diameter shown in FIG. 6 to a somewhat reduced diameter shown in FIG. 3. When the retainer ring 92 is in the groove 94 (FIG. 3), the retainer ring is resiliently expanded to a size which is greater than the initial or undeflected size of the retainer ring (FIG. 4) and is less than the maximum size of the retainer ring (FIG. 6).

As the retainer ring 92 moves into the groove 94, the circular rim 134 on the inner socket part 14 further compresses the seal ring 36 against the flat annular inner side surface 136 of the axially outer socket part 16. By compressing the seal ring 36 between the rim 134 on the socket part 14 and inner side surface 136 on the socket part 16, radially outward fluid flow through the connection between the socket parts 14 and 16 is blocked. The retainer ring 92 cooperates with the axially outer side surface 102 of the groove 94 in the inner socket part 14 and the axially outer side surface 104 of the groove 96 in the outer socket part 16 to hold the socket parts 14 and 16 against axial movement relative to each other and maintain the seal ring 36 compressed between the socket parts.

The compressive forces applied against the socket parts 14 and 16 by the seal ring 36 presses the side surface 102 of the socket part 14 firmly against the retainer ring 92 and presses the side surface 122 of the groove 96 in the socket part 16 firmly against the retainer ring. This preloading force holds the two socket parts 14 and 16 against wobbling type movement relative to each other. Once the socket parts 14 and 16 have been interconnected by the retainer ring 92 in the manner illustrated in FIG. 3, the socket parts cannot be separated without destroying the retainer ring 92 or a portion of one of the socket parts.

Conclusion

In view of the foregoing description, it is apparent that the socket assembly 10 (FIG. 1) receives the plug 26 (FIG. 2) to enable fluid to be conducted between the socket assembly and the plug. The socket assembly 10 includes a socket body 12 having first and second socket parts 14 and 16 which are interconnected by a retainer ring 92 disposed in grooves 94 and 96 in the socket parts. A resilient seal ring 36 is compressed between surfaces 134 and 136 on the socket parts 14 and 16 to press the socket parts against the retainer ring.

When the first and second socket parts 14 and 16 are to be interconnected, the retainer ring 92 is telescopically positioned on an end portion 108 of the first socket part 14 (FIG. 4) at a location offset from an outwardly opening groove 94 in the first socket part. The retainer ring 92 is engaged with the outwardly opening groove 94 in the first socket part 14 and an inwardly opening groove 96 in the second socket part 16 by pressing against the retainer ring with the second socket part to move the retainer ring toward the groove in the first socket part and resiliently expand the retainer ring. As the retainer ring 92 is moved toward the groove 94 in the first socket part 14, a seal ring 36 is compressed between the two socket parts. After the socket parts 14 and 16 have been interconnected (FIG. 3), a plug 26 (FIG. 2) can be inserted into a socket chamber 20 formed by the socket parts 14 and 16. A locking assembly 48 is disposed on the one socket part 16 to engage the plug 26 and hold it in the socket chamber 20.

Having described one specific preferred embodiment of the invention, the following is claimed:

1. A method comprising the steps of providing a first socket part having an outwardly opening groove, providing a second socket part having an inwardly opening groove, providing a resilient retainer ring, telescopically positioning the retainer ring on an end portion of the first socket part at a location axially offset from the groove in the first socket part, engaging the grooves in the first and second socket parts with the retainer ring by pressing against the retainer ring with the second socket part to move the retainer ring axially toward the groove in the first socket part and resiliently expanding the retainer ring under the influence of force applied against an inner side area of the retainer ring by the first socket part as the retainer ring moves axially toward the groove in the first socket part, thereafter, inserting a plug into a socket chamber which is at least partially formed by one of the socket parts, and retaining the first and second socket parts against movement relative to each other by abutting engagement of surfaces of the grooves in the first and second socket parts with the retainer ring when the plug is in the socket chamber.

2. A method as set forth in claim 1 wherein said step of resiliently expanding the retainer ring includes increasing the size of the retainer ring from a first size to a second size as it moves toward the groove in the first socket part and then decreasing the size of the retainer ring from the second size to a third size as the retainer ring engages the groove in the first socket part, the third size of the retainer ring being smaller than the second size and larger than the first size.

3. A method as set forth in claim 2 wherein said step of moving the retainer ring toward the groove in the first socket part includes initiating movement of the retainer ring across an edge of the groove in the first socket part with the retainer ring expanded to the second size.

4. A method as set forth in claim 1 further including compressing a seal ring between the first and second socket parts during movement of the retainer ring toward the groove in the first socket part.

5. A method as set forth in claim 4 further including the step of applying force in a first direction against the first socket part with the seal ring and applying force in a second direction against the second socket part with the seal ring after engaging the grooves in the first and second socket parts with the retainer ring.

6. A method as set forth in claim 5 further including the step of sealingly engaging an end portion of the plug with the seal ring as the plug is inserted into the socket chamber.

7. A method as set forth in claim 6 further including the step of moving a valve member from a closed position to an open position as the plug is inserted into the socket chamber.

8. A method as set forth in claim 1 further including the step of engaging the plug with a locking element mounted on one of the socket parts to retain the plug in the socket chamber after performance of said step of inserting the plug into the socket chamber.

* * * * *